June 27, 1967 S. N. BEESON 3,327,389
CUTTING TOOL WITH WORK GRIPPING MEANS
Filed Nov. 30, 1965
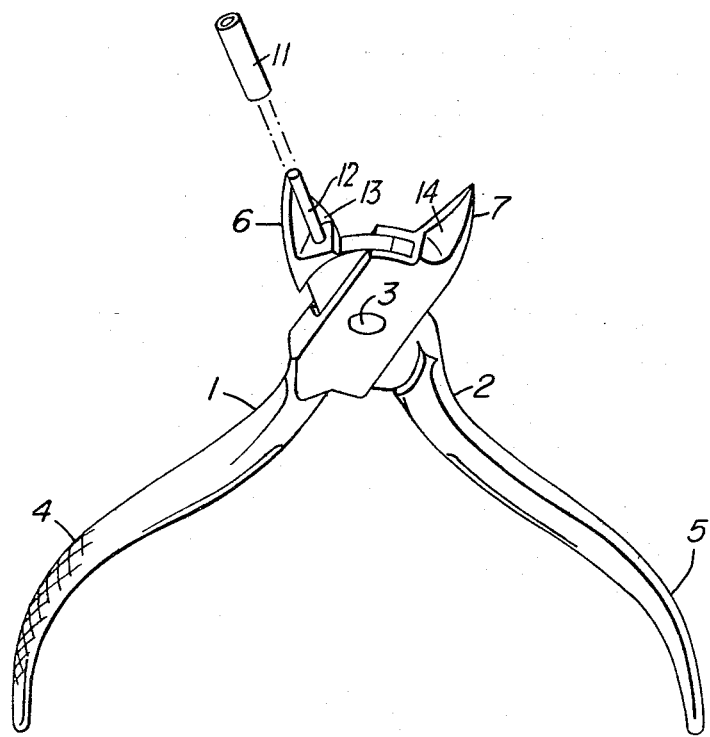

United States Patent Office 3,327,389
Patented June 27, 1967

3,327,389
CUTTING TOOL WITH WORK GRIPPING MEANS
Samuel Neville Beeson, Tyldesley, near Manchester, England, assignor to Hawker Siddeley Dynamics Limited, Hatfield, England
Filed Nov. 30, 1965, Ser. No. 510,644
Claims priority, application Great Britain, Dec. 1, 1964, 48,882/64
1 Claim. (Cl. 30—124)

This invention relates to cutting tools of the type wherein two or more blades interact to provide a shearing action.

It is mainly concerned with hand tools, e.g. snips, pliers, scissors and the like and its object is to prevent the portion of the work that is to be severed from falling or flying free at the moment of shear.

According to the invention a cutting tool is provided with an elastically deformable member so situated in relation to one of the blades that gripping or trapping of the work portion to be severed occurs by said member and the other blade, or a part associated with the other blade, on closure of the blades. Thus, the severed portion is held until it can be collected or otherwise dealt with, instead of falling to the floor or flying off at the instant of cutting.

The elastically deformable member may be supported on a resilient support member and may, if desired, be removable therefrom.

One form of tool embodying the invention will now be described by way of example and with reference to the accompanying single figure drawing, in which is shown in pictorial view a pair of side cutting wire snips provided with a work-holding gripping member in accordance with the invention.

In the drawing, the wire snips as shown comprise two lever members 1, 2 pivotally connected at 3 and having handle portions 4,5 and jaw portions 6, 7. The jaw portions 6, 7, have cooperating wire-cutting blades 13, 14. A work-gripping member is provided consisting of a removable elastically deformable sleeve 11 or synthetic plastic or rubber surrounding a resilient steel pin 12, said pin being fixed to one jaw 6 of the snips, quite close to and more or less parallel with the cutting edge of the blade 13 on that jaw, in a position such that when a wire is severed the severed portion is gripped between the sleeve 11 and the other blade 14, at least until the blades are opened.

It is apparent that the sleeve need not contact the other blade upon closure of the blades if the workpiece is of sufficient thickness but merely has to come close enough for deformation to occur in trapping the sheared portion of the workpiece.

I claim:

A cutting tool having a pair of jaws with cooperating blades and provided with a work-gripping member so disposed in relation to one of the blades that gripping or trapping of a work portion to be severed occurs between said member and the other blade on closure of the blades, said gripping member comprising a resilient metal pin having a removable sleeve mounted on a portion thereof, said sleeve being formed of an elastically deformable material, said pin being located between the jaws and affixed to one of said jaws adjacent a cutting edge on said one blade, and said portion of the pin carrying said sleeve extending substantially parallel with the cutting edge.

References Cited

UNITED STATES PATENTS

| 403,500 | 5/1889 | Wingenroth | 30—135 |
| 406,524 | 7/1889 | Jennings | 30—135 |
| 2,302,810 | 11/1942 | Steegmuller | 30—124 |
| 2,775,032 | 12/1956 | Sorenson | 30—134 |
| 2,814,869 | 12/1957 | Matson | 30—124 |
| 2,985,957 | 5/1961 | Freedman | 30—124 |

FOREIGN PATENTS 10,064 7/1895 Great Britain.

WILLIAM FELDMAN, *Primary Examiner.*

G. WEIDENFELD, *Assistant Examiner.*